United States Patent
Reiss et al.

(10) Patent No.: US 9,823,917 B2
(45) Date of Patent: Nov. 21, 2017

(54) UPDATE APPLICATION USER INTERFACES ON CLIENT DEVICES

(75) Inventors: David Scott Reiss, Mountain View, CA (US); Matthew Nicholas Papakipos, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/278,136

(22) Filed: Oct. 20, 2011

(65) Prior Publication Data

US 2013/0104114 A1    Apr. 25, 2013

(51) Int. Cl.
*G06F 9/44*    (2006.01)
*G06F 9/445*   (2006.01)
*H04L 29/08*   (2006.01)

(52) U.S. Cl.
CPC ............ *G06F 8/65* (2013.01); *G06F 8/38* (2013.01); *G06F 8/67* (2013.01); *G06F 9/4443* (2013.01); *H04L 67/2852* (2013.01)

(58) Field of Classification Search
CPC ...... G06F 3/048; G06F 8/65; G06F 17/30174; H04L 29/06027; H04L 67/2852
USPC ........ 709/203; 717/121, 168, 178, 170–172; 455/418; 713/200
See application file for complete search history.

(56) References Cited

U.S. PATENT DOCUMENTS

| | | | | |
|---|---|---|---|---|
| 6,167,567 A * | 12/2000 | Chiles | ........... | G06F 9/4448 709/221 |
| 6,393,605 B1 * | 5/2002 | Loomans | ........... | 717/121 |
| 6,718,549 B1 * | 4/2004 | Narin | ........... | G06F 8/65 709/203 |
| 7,257,775 B1 * | 8/2007 | Jivakov | ........... | G06F 9/4443 715/742 |
| 7,269,618 B2 * | 9/2007 | Nakajima | ........... | G06F 17/30899 707/E17.119 |
| 7,415,706 B1 * | 8/2008 | Raju | ........... | G06F 9/44536 717/170 |
| 7,509,374 B2 * | 3/2009 | Trinh et al. | ........... | 709/203 |
| 7,620,392 B1 * | 11/2009 | Maurya | ........... | G06F 8/65 455/418 |
| 7,685,595 B1 * | 3/2010 | Manahan | ........... | G06F 8/61 717/174 |
| 7,802,246 B1 * | 9/2010 | Kennedy | ........... | G06F 8/61 717/173 |
| 7,827,546 B1 * | 11/2010 | Jones | ........... | G06F 8/65 717/168 |
| 8,151,259 B2 * | 4/2012 | Fadell | ........... | H04L 29/06027 717/168 |

(Continued)

OTHER PUBLICATIONS

Butter, Thomas et al., "Context-aware User Interface Framework for Mobile Applications", 2007, IEEE, 27th International Conference on Distributed Computing Systems Workshops (ICDCSW'07).*

(Continued)

*Primary Examiner* — Lewis A Bullock, Jr.
*Assistant Examiner* — Gilles Kepnang
(74) *Attorney, Agent, or Firm* — Baker Botts L.L.P.

(57) ABSTRACT

In one embodiment, receiving a notice that a new version of a user interface of an application is available; storing information about the new version of the user interface; requesting permission from the application to update the user interface to the new version; and if the application grants the permission, then replacing an old version of the user interface of the application with the new version.

24 Claims, 4 Drawing Sheets

(56) References Cited

U.S. PATENT DOCUMENTS

| | | | |
|---|---|---|---|
| 8,261,258 B1* | 9/2012 | Jianu et al. | 717/174 |
| 8,302,014 B2* | 10/2012 | Lezama Guadarrama | G06F 9/4443 715/744 |
| 8,607,221 B1* | 12/2013 | Donahue | G06F 8/65 717/173 |
| 8,667,480 B1* | 3/2014 | Sigurdsson | G06F 8/65 717/168 |
| 8,667,487 B1* | 3/2014 | Boodman et al. | 717/178 |
| 8,799,866 B2* | 8/2014 | Bullard | G06F 3/048 717/125 |
| 9,003,312 B1* | 4/2015 | Ewe | G06F 8/38 715/744 |
| 2003/0101255 A1* | 5/2003 | Green | 709/223 |
| 2004/0003390 A1* | 1/2004 | Canter et al. | 717/178 |
| 2004/0103411 A1* | 5/2004 | Thayer | 717/171 |
| 2004/0187103 A1* | 9/2004 | Wickham et al. | 717/168 |
| 2005/0028007 A1* | 2/2005 | Hashiguchi | 713/200 |
| 2005/0066018 A1* | 3/2005 | Whittle et al. | 709/223 |
| 2005/0108433 A1* | 5/2005 | Wu | G06F 9/4448 709/246 |
| 2006/0046703 A1* | 3/2006 | Liu et al. | 455/418 |
| 2006/0150109 A1* | 7/2006 | Schultz | G06F 9/4443 715/759 |
| 2006/0200538 A1* | 9/2006 | Yuh | G06F 8/65 709/219 |
| 2007/0157194 A1* | 7/2007 | Balakrishnan et al. | 717/172 |
| 2007/0192763 A1* | 8/2007 | Helvick | 717/168 |
| 2008/0016504 A1* | 1/2008 | Cheng | G06F 8/65 717/168 |
| 2008/0222618 A1* | 9/2008 | Valtchev | G06F 9/4443 717/139 |
| 2009/0204422 A1* | 8/2009 | James | G06F 8/65 705/2 |
| 2009/0249321 A1* | 10/2009 | Mandyam et al. | 717/171 |
| 2009/0271779 A1* | 10/2009 | Clark | G06F 17/30174 717/171 |
| 2009/0288077 A1* | 11/2009 | Miranda-Steiner | G06F 8/65 717/173 |
| 2009/0318192 A1* | 12/2009 | Leblanc | G11B 27/10 455/558 |
| 2009/0319933 A1* | 12/2009 | Zaika | G06F 3/048 715/772 |
| 2010/0058191 A1* | 3/2010 | Hawkins | G06F 17/30873 715/738 |
| 2010/0088692 A1* | 4/2010 | Rathi | G06F 8/65 717/171 |
| 2010/0161717 A1* | 6/2010 | Albrecht | H04L 67/2852 709/203 |
| 2010/0229045 A1* | 9/2010 | Schultz et al. | 714/37 |
| 2010/0281475 A1* | 11/2010 | Jain | G06F 8/68 717/172 |
| 2011/0093562 A1* | 4/2011 | Yuh | G06F 8/65 709/217 |
| 2011/0126130 A1* | 5/2011 | Lieb et al. | 715/753 |
| 2011/0154228 A1* | 6/2011 | Kinoshita | G06F 3/0488 715/763 |
| 2011/0167364 A1* | 7/2011 | Pentikainen | G06F 9/4443 715/764 |
| 2011/0307798 A1* | 12/2011 | Lezama Guadarrama | G06F 9/4443 715/744 |
| 2011/0321024 A1* | 12/2011 | Knothe et al. | 717/168 |
| 2011/0321029 A1* | 12/2011 | Kern | G06F 8/65 717/170 |
| 2012/0117556 A1* | 5/2012 | Hungerford | H04L 12/585 717/171 |
| 2012/0166976 A1* | 6/2012 | Rauh | G06F 8/38 715/762 |
| 2012/0167041 A1* | 6/2012 | Payzer | G06F 21/6209 717/113 |
| 2012/0236012 A1* | 9/2012 | Wang | G06F 9/4443 345/520 |
| 2012/0311020 A1* | 12/2012 | Brown | G06F 12/0862 709/203 |
| 2013/0151996 A1* | 6/2013 | Nario | H04W 4/003 715/760 |
| 2014/0215356 A1* | 7/2014 | Brander | H04L 67/36 715/753 |

OTHER PUBLICATIONS

Vartiainen, Elina et al. "Auto-update: a concept for automatic downloading of web content to a mobile device." 2007. Proceedings of the 4th international conference on mobile technology, applications, and systems and the 1st international symposium on Computer human interaction in mobile technology. ACM.*

* cited by examiner

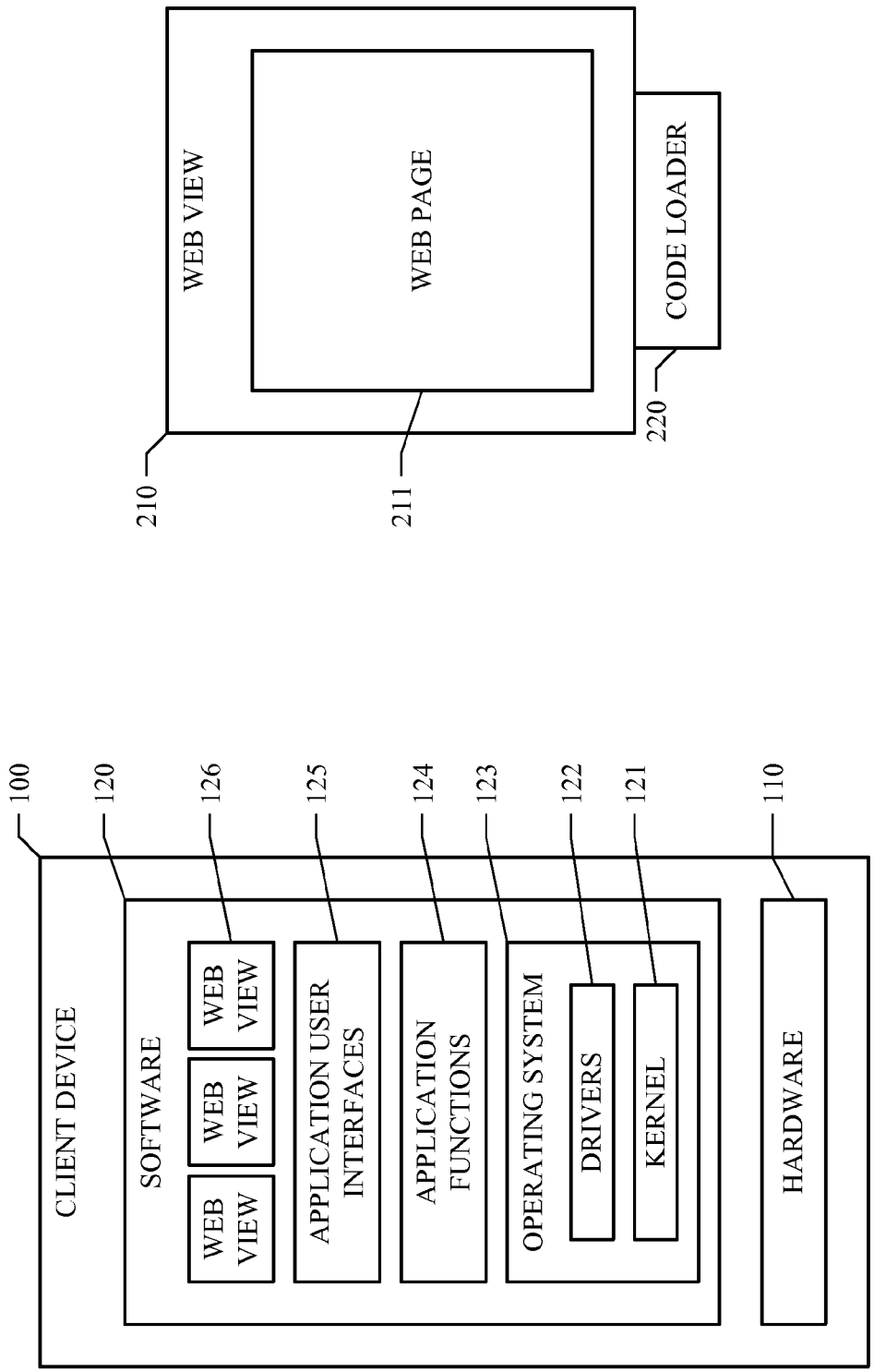

UPDATE APPLICATION USER INTERFACES ON CLIENT DEVICES

TECHNICAL FIELD

This disclosure generally relates to updating the user interface of a software application executing on a client device.

BACKGROUND

Within a client-server environment, a client may receive services from a server over a computer network. Examples of client devices include, but not limited to, desktop computers, notebook computers, netbook computers, smart phones, personal digital assistants (PDA), etc. These clients are able to connect to a computer or communications network, such as the Internet or a mobile telephone network, and access and communicate with the servers that are also connected to the network using various suitable communications protocols. A client is thus able to transmit data to and receive data from a server over the network.

Often, in a client-server environment, web-based applications may be hosted on the servers and accessed from the clients.

SUMMARY

This disclosure generally relates to updating the user interface of a software application executing on a client device.

In particular embodiments, receiving a notice that a new version of a user interface of an application is available; storing information about the new version of the user interface; requesting permission from the application to update the user interface to the new version; and if the application grants the permission, then replacing an old version of the user interface of the application with the new version.

These and other features, aspects, and advantages of the disclosure are described in more detail below in the detailed description and in conjunction with the following figures.

BRIEF DESCRIPTION OF THE DRAWINGS

FIG. 1 illustrates an example client device.
FIG. 2 illustrates an example user interface of a software application executing on a client device.

DESCRIPTION OF EXAMPLE EMBODIMENTS

Figure 3:
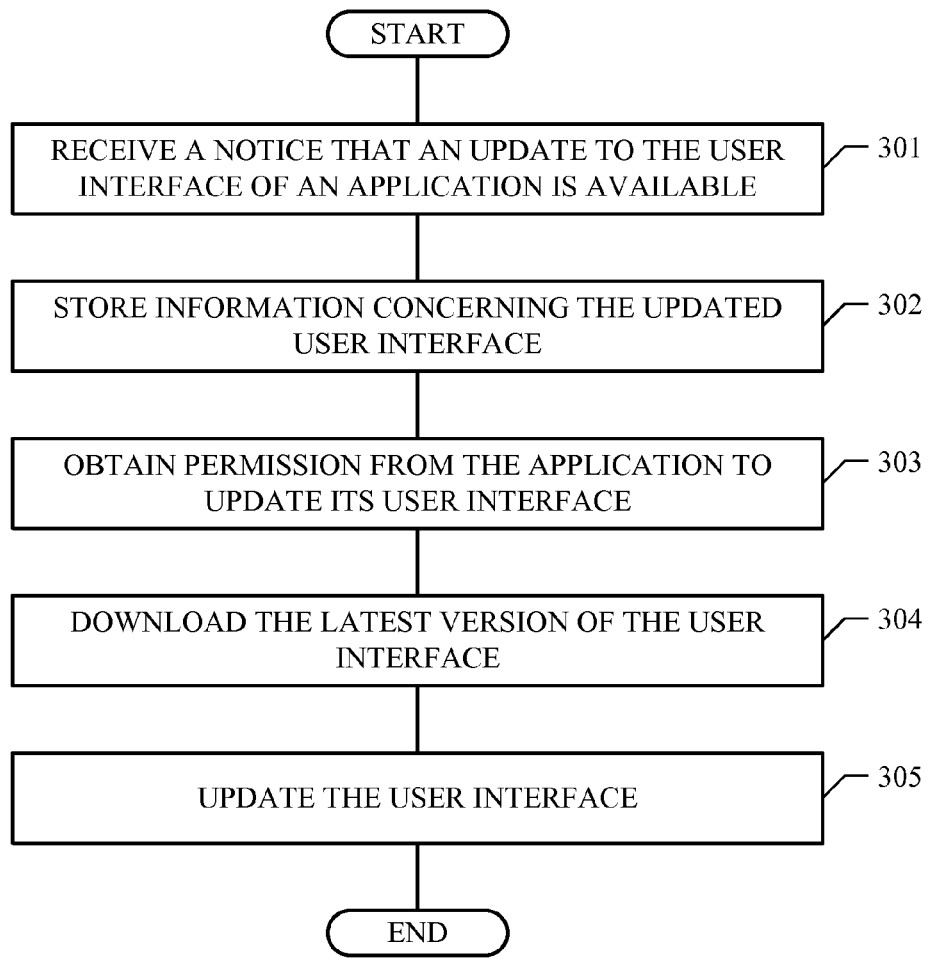
FIG. 3 illustrates an example method of updating the user interface of a software application executing on a client device.

This disclosure is now described in detail with reference to a few embodiments thereof as illustrated in the accompanying drawings. In the following description, numerous specific details are set forth in order to provide a thorough understanding of this disclosure. However, This disclosure may be practiced without some or all of these specific details. In other instances, well known process steps and/or structures have not been described in detail in order not to unnecessarily obscure This disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Within a client-server environment, a client may transmit data to and receive data from a server over a computer or communications network. There are many types of client devices, such as, for example and without limitation, desktop computers, notebook computers, netbook computers, mobile telephones, smart phones, and handheld electronic devices. Some of these client devices have wired network connections and some have wireless network connections. They are capable of communicating with other devices over one or more types of networks using various suitable communications protocols. FIG. 1 illustrates an example client device 100. In particular embodiments, client device 100 may be a smart phone, which is a mobile telephone that offers more advanced computing ability and connectivity than a traditional mobile phone. It may be considered as a handheld computer integrated with a mobile phone.

In particular embodiments, client device 100 includes both hardware 110 and software 120. In particular embodiments, hardware 110 may include any number of components such as, for example and without limitation, processor, memory, storage, transceiver, display, keypad, camera, global positioning system (GPS) sensor, microphone, speaker, and so on. In particular embodiments, software 120 may include an operating system 123, which may include a kernel 121 and any number of drivers 122 corresponding to the hardware components available on client device 100. Operating system 123 may be selected for client device 100 based on the actual type of device client device 100 is. For example, if client device 100 is a mobile device (e.g., a smart phone), then operating system 123 may be a mobile operating system such as, for example and without limitation, Microsoft's Windows Mobile, Google's Android, Nokia's Symbian, Apple's iOS, and Samsung's Bada.

In particular embodiments, one or more software applications may be executed on client device 100. In particular embodiments, they may be web-based applications hosted on servers. For example, a web-based application may be associated with a URI (Uniform Resource Identifier) or URL (Uniform Resource Locator). From client device 100, a user may access the web-based application through its associated URI or URL (e.g., using a web browser). Alternatively, in other embodiments, they may be native applications installed and residing on client device 100. Thus, software 120 may also include any number of application functions 124 and application user interfaces 125. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using client device 100; a fifth application may allow the device user to receive and initiate VoIP and/or cellular network calls, and so on. Each application has one or more specific functionalities, and the software (e.g., one or more software modules) implementing these functionalities may be included in application functions 124. Each application may also have a user interface that enables the device user to interact with the application, and the software implementing the application user interface may be included in application user interfaces 125. In particular embodiments, the functionalities of an application may be implemented using JavaScript, Java, C, or other suitable programming languages. In particular embodiments, the user interface of an application may be implemented using HyperText Markup Language (HTML), JavaScript, Java, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 123 is Google's Android. With Android, there is a Java package called "android.webkit", which provides various tools for browsing the web. Among the "android.webkit" package, there is a Java class called "android.webkit.WebView", which implements a View for displaying web pages. This Java class uses the WebKit rendering engine to display web pages and includes methods to navigate forward and backward through a history, zoom in, zoom out, perform text searches, and so on. In particular embodiments, an application user interface 125 may utilize Android's WebView application programming interface (API) to display each web page of the user interface in a View implemented by the "android.webkit.WebView" class. Thus, in particular embodiments, software 120 may include any number of web views 126, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 126 or application user interfaces 125. Each input event may be forwarded to application functions 124, or application functions 124 may listen for input events thus generated. When application functions 124 receive an input event, the appropriate software module in application functions 124 may be invoked to process the event. In addition, specific functionalities provided by operating system 123 and/or hardware 110 may also be invoked. For example, if the event is generated as a result of the user pushing a button to take a photo with client device 100, a corresponding image processing module may be invoked to convert the raw image data into an image file (e.g., JPG or GIF) and store the image file in the storage of client device 100. As anther example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 124 or operating system 123. Each output event may be forwarded to application user interfaces 125, or application user interfaces 125 may listen for output events thus generated. When application user interfaces 125 receive an output event, it may construct a web view 126 to display a web page representing or containing the output. For example, in response to the user selecting an icon to compose an instant message, an output may be constructed that includes a text field that allows the user to input the message. This output may be presented to the user as a web page and displayed to the user in a web view 126 so that the user may type into the text field the message to be sent.

The user interface of an application may be implemented using a suitable programming language (e.g., HTML, JavaScript, or Java). More specifically, in particular embodiments, each web page that implements a screen or display of the user interface may be implemented using a suitable programming language. In particular embodiments, when a web view 126 is constructed to display a web page (e.g., by application user interfaces 125 in response to an output event), the code implementing the web page is loaded into web view 126.

FIG. 2 illustrates an example user interface of a software application executing on a client device. In particular embodiments, a web page 211, which may be a part of the user interface of an application executing on a client device, may be displayed in a web view 210. In particular embodiments, when web view 210 is constructed (e.g., by the application's user interface) to display web page 211, a code loader 220 is attached to web view 210. In particular embodiments, code loader 220 is responsible to loading the code implementing web page 211 so that web page 211 may be displayed in web view 210.

Software developers often update their software from time to time in order to, for example, add new functionalities, improve existing functionalities, fix errors (i.e., bugs), etc. Any part of a piece of software (e.g., the functional modules or the user interface) may be updated from time to time. Usually, each time a piece of software is updated, the updated code is referenced as a new version of the software. Thus, a piece of software may have multiple versions as it may be updated multiple times. In particular embodiments, when code loader 220 is attached to newly constructed web view 210, code loader 220 is provided with the latest version of web page 211 that is available to the client device on which web view 210 resides at the time web view 210 is constructed. Code loader 220 in turn loads the latest version of web page 211 at the time web view 210 is constructed.

FIG. 3 illustrates an example method of updating the user interface of a software application executing on a client device. The steps illustrated in FIG. 3 may be repeated each time the user interface of the application is updated. As described above, an application may have multiple versions as it may be updated multiple times. In particular embodiments, each version of the application may be identified by a unique version number. For example, the first version of the application may be version 1; the second version of the application may be version 2; and so on. In particular embodiments, an application is separated into two parts: the user interface and the underlying functionalities. Each part may be updated separately and individually. The user interface of the application may have multiple versions, and each version of the user interface may be identified by a unique version number (e.g., user-interface version number).

In particular embodiments, when a new version of the application user interface is available and ready to be deployed, it may be assigned the latest version number, and more specifically, the latest user-interface version number. The code implementing the new version of the application user interface may be stored on a network-capable device (e.g., a server). The code implementing the new version of the application user interface may be contained in any number of files, and each file may have a unique Uniform Resource Identifier (URI) or Uniform Resource Locator (URL), which may include the domain name or Internet Protocol (IP) address of the server on which the file is stored together with the path and name of the file. In particular embodiments, a message regarding the new version of the application user interface may be broadcast throughout the network, identifying the new version of the application user interface by its version number and notifying client devices of its availability.

In particular embodiments, a client device may receive a notice (e.g., in the form of a broadcasting message) indicating that an update (i.e., a new version) to the user interface of an application is available, as illustrated in STEP 301. The notice may identify the specific application user interface for which an update is available and the version number of the code implementing the updated application user interface.

In particular embodiments, instead of immediately replacing the old version of the application user interface currently existing on the client device with the new version, the client device stores the new version of the application user interface in its storage, as illustrated in STEP 302. In particular embodiments, a table may be used to store individual versions of an application user interface. Whenever a new version becomes available, it is added to the table. The following is an example TABLE 1 that may be used to store multiple versions of an application user interface.

TABLE 1

VERSIONS OF AN APPLICATION'S USER INTERFACE

| Version | File Path | File Content |
|---|---|---|
| 1, timestamp | app/ui/v1/home.html | ... |
| 1, timestamp | app/ui/v11/login.jsp | ... |
| ... | ... | ... |
| 2, timestamp | app/ui/v2/home.html | ... |
| 2, timestamp | app/ui/v2/product.html | ... |
| ... | ... | ... |

In this example, TABLE 1 has three columns and one or more rows. The first column relates to version number and timestamp; the second column relates to file path; and the third column relates to file content. Each file included in each version of the application user interface occupies one row. Along a specific row corresponding to a specific file included in a specific version, the version number and timestamp of the specific version is stored in the first cell (i.e., the first column); the path of the specific file within the specific version is stored in the second cell (i.e., the second column); and the actual content (e.g., code) of the specific file is stored in the third cell (i.e., the third column). In particular embodiments, the content of each file may be stored in the table as a binary large object (blob). In particular embodiments, some of the information stored in TABLE 1 (e.g., version number) may be extracted from the broadcasting notices received by the client device and some of the information (e.g., file content) may be downloaded directly from the server.

Alternatively, in particular embodiments, data relating to the individual versions of an application user interface may be stored in three separate tables. The following TABLE 2 is an example table for storing version information of the individual versions of the application user interface.

TABLE 2

VERSION INFORMATION OF AN APPLICATION'S USER INTERFACE

| Version Number | Timestamp | Version Manifest | Retrieved (Y/N) |
|---|---|---|---|
| 1 | ... | ... | Y |
| 2 | ... | ... | Y |
| ... | ... | ... | ... |
| 7 | ... | ... | N |
| ... | ... | ... | ... |

In this example, each version of the application user interface has a version number, a timestamp indicating when the version becomes available, a version manifest describing the content, features, functionalities, files, and other suitable information concerning the version, and an indicator for whether the version has been retrieved by the client device (e.g., from the server). After a specific version has been successfully downloaded to the client device, the "retrieval" indicator may be updated to reflect the download.

The following TABLE 3 is an example table for storing file path information of the files in the individual versions of the application user interface.

TABLE 3

FILE PATH INFORMATION OF AN APPLICATION'S USER INTERFACE

| Version Number | Version Manifest Content | File Path |
|---|---|---|
| 1 | ... | app/ui/v1/home.html; app/ui/v1/login.html; ... |
| 2 | ... | app/ui/v2/home.html; app/ui/v2/product.html; ... |
| ... | ... | ... |

In this example, each version of the application user interface has a manifest, which may identify the individual files included in that version. Each file in each version may be referenced by a unique file path within the version.

The following TABLE 4 is an example table for storing file content information of the files in the individual versions of the application user interface.

TABLE 4

FILE CONTENT INFORMATION OF AN APPLICATION'S USER INTERFACE

| Version Number | File Content | File Content Hash |
|---|---|---|
| 1 | ... | ... |
| 1 | ... | ... |
| ... | ... | ... |
| 2 | ... | ... |
| ... | ... | ... |

In this example, the content of each file is stored in connection with the application user interface version to which it belongs. In particular embodiments, the content of each file may be stored in the table as a blob. In particular embodiments, for each file in each version, a hash value is obtained by applying a suitable hashing algorithm to the content of the file. The hash value thus obtained for each file is also stored with the content of the file.

Often, the same file may exist in multiple versions of the application user interface, and its content may stay the same or may be changed from one version to another version. In particular embodiments, the hash value of a file may be used to determine whether the content of the file has changed from one version to another version. If the hash value of the file has changed from one version to another version, then the content of the file has also changed. Conversely, if the hash value of the file has remained the same from one version to another version, then the content of the file has also remained the same.

In particular embodiments, when a new version of the user interface of an application is available, the client device obtains permission from the application on whether to update its user interface and when (e.g., either at that time or at a later time), as illustrated in STEP 303. For example, if the application happens to be running on the client device when a new version of its user interface becomes available, the application may choose to update its user interface at a later time in order not to inconvenience the user and interrupt the progress of the application. In this case, the application may choose to update its user interface the next time the application is executed by the user. Alternatively, the application may choose to update its user interface when the user is not actively using it, or upon rebooting the client device. Alternatively, the application may ask the user whether the user wishes to update the application user interface at that time or at a later time. Alternatively, the application may choose to update its user interface at a specific time. Alternatively, the application may choose to update its user interface immediately, in which case the web view where the current version of the user interface is displayed is discarded, and a new web view is constructed. Alternatively, the application may choose not to update its user interface to this specific version. Thus, in particular embodiments, the application has control of whether and when to update its user interface. Alternatively, in some embodiments, although an application may have control over whether and when to update its user interface, the operating system of the client device may have the authority to override the application's policy or decision (e.g., when necessary or appropriate).

In particular embodiments, if the application gives permission to update its user interface to a specific version, the client device may download the files included in that version of the application user interface from the server where the files are stored, as illustrated in STEP 304. The files included in a version of the application user interface may be downloaded at any suitable time. For example, in particular embodiments, the client device may download the files of a new version as soon as it receives notice that the new version is available and stores the content of the files in its storage (e.g., in a suitable table as described above). In this case, STEP 304 may occur before or at the same time as STEP 303. Alternatively, in particular embodiments, the client device may wait until the application gives permission to update the user interface to the new version before downloading the files of the new version. In this case, if the application does not give permission to update its user interface to a specific version, the files of that version are never downloaded to the client device, thus saving storage space and downloading effort.

In particular embodiments, the files of a version of the application user interface may be downloaded using HTTP (Hypertext Transfer Protocol) or HTTPS (HTTP Secure). When downloading the files of a version, the client device may use the information stored in any of the tables described above in connection with STEP 302. For example, the client device may access one or more of the table to determine which files are included in the specific version and on which server they are stored.

In particular embodiments, the files of a specific version of the application user interface may be compressed and/or achieved into a single file (e.g., a zip file). Thus, each version has a corresponding zip file. The client device may download the zip file of the desired version and then uncompress and/or extract the individual files of that version. In particular embodiments, there may be various security measures connected with downloading the zip file that contains the files of a specific version of the application user interface. For example, a hash value may be computed for the zip file using a suitable hash algorithm, which may be used to verify that the downloaded copy of the zip file is uncorrupted. To do so, after a copy of the zip file is downloaded to the client device, a second hash value may be computed for the downloaded zip file using the same hash algorithm, and compared with the original hash value. If the two hash values match, then the downloaded copy of the zip file is uncorrupted. As another example, the zip file may be encrypted with a private key. A corresponding public key has been stored on the client device previously (e.g., in the flash memory of a mobile phone). In this case, only client devices with the public key are able to decrypt the zip file. As a third example, the zip file may be downloaded via a secure connection (e.g., https) established between the server and the client device. The present disclosure contemplates any suitable security measures.

Alternatively, in particular embodiments, the files of a version of the application user interface may be downloaded individually. In particular embodiments, for each file included in the version, the client device may check whether the hash value computed for the content of the file (e.g., as illustrated in TABLE 4) is the same as or different from the hash value computed for the content of the same file from a previous version, which already exists on the client device. The file is downloaded again only if the hash value has changed from a previous version. Otherwise, the content of the file from the previous version is used as it has not changed.

In particular embodiments, when granting permission to update its user interface, an application may optionally specify a condition, such that the user interface is updated (i.e., the update is applied) when this condition is satisfied. For example, the application may indicate that its user interface should be updated to a new version the next time the application is executed by the user. In this case, after downloading the files included in the new version of the user interface of the application, the files may be stored, temporarily, on the client, until they are needed for updating the user interface to the new version. Alternatively, in other embodiments, after receiving permission to update its user interface to the new version from the application, the files included in the new version of the user interface are downloaded. The user interface of the application is updated to the new version automatically. In this case, the application does not specify any condition. Alternatively, in other embodiments, the user interface of an application is updated to a new version automatically (e.g., when the new version becomes available) without seeking permission from the application.

In particular embodiments, the files of older versions of the application user interface stored on the client device may be cleaned up from time to time so that the client device's storage space is not used up. For example, each version of the user interface may be associated with an expiration time. When a specific version has expired, the files of that version are deleted from the client device's storage. As another example, when an old version of the user interface is replaced with a new version, the old version is removed from the client device when the new version has been used. As another example, the user of the client device may request that a specific version of the user interface be removed. Upon receiving such a request, the files of that version are deleted from the client device's storage. In a third example, the application may control when to remove the files of a specific version of it user interface from the client device.

After the files of a specific version of the application user interface has been downloaded to the client device, in particular embodiments, the client device may update the application user interface to this version, as illustrated in STEP 305. In particular embodiments, if there is a web view currently running on the client device displaying a previous version of the user interface, the application exits from the web view and the web view is discarded. The application may then construct a new web view (e.g., web view 210 illustrated in FIG. 2) for the new version of the user interface. A code loader (e.g., code loader 220 illustrated in FIG. 2) is attached with the web view, and the code load is set to load the code contained in the files of the updated version of the application user interface for display in the web view (e.g., as web pages).

In particular embodiments, when a web view is first constructed, a code loader is attached to the web view for loading the code (e.g., HTML, Java, JavaScript, or CSS) implementing one or more web pages that represent the user interface of an application so that the web pages may be displayed in the web page. In particular embodiments, the code loader is set to load the code of the latest version of the application user interface available on a client device when the web view is constructed. In particular embodiments, as long as the web view runs on the client device, the same version of the application user interface is displayed in the web view. To switch to and display a second, different version of the application user interface, the existing web view needs to be discarded and a new web view needs to be constructed. The code loader attached to the new web view is then set to load the code of the second version of the application user interface.

In particular embodiments, the client-server environment described above may be connected with an online social-networking system. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

The applications whose user interfaces are updated may be provided by the social-networking system or third parties connected with the social-networking system. The versions of the application user interfaces may be stored on one or more servers connected with or hosting the social-networking system. The client devices may be associated with users of the social-networking system.

Figure 4:
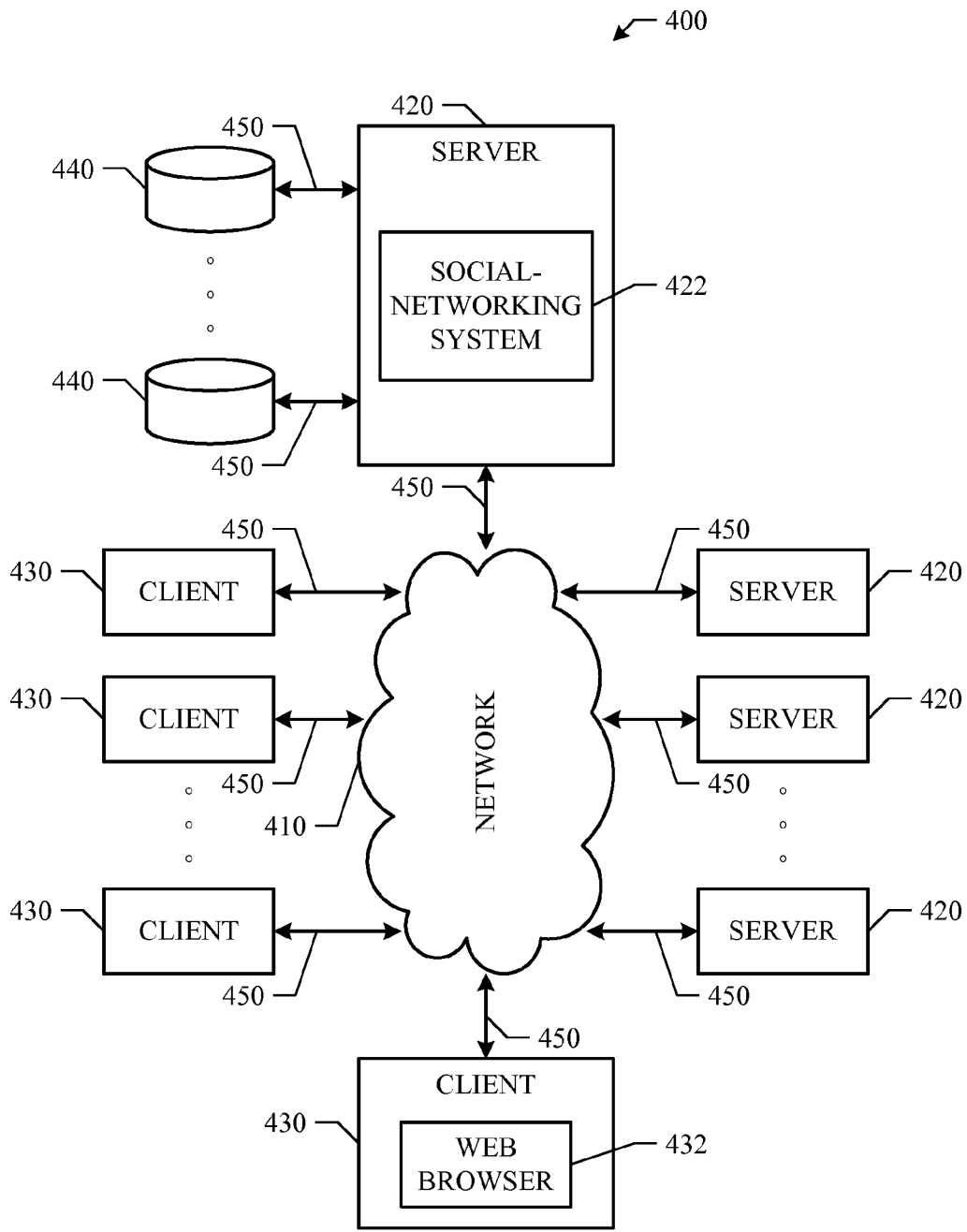
FIG. 4 illustrates an example network environment.

Particular embodiments may be implemented in a network environment. FIG. 4 illustrates an example network environment 400. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. This disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. This disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores. In particular embodiments, a social-networking system 422 may be hosted on a server 420.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiments, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. This disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
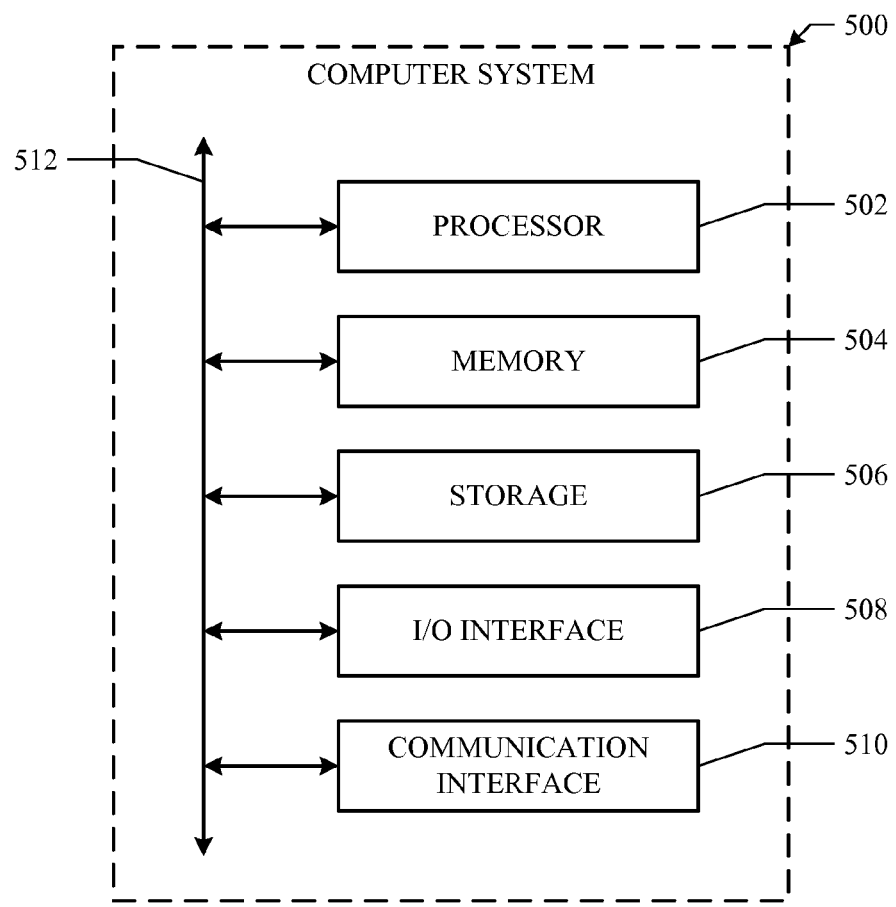
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device:
displaying a user interface for a running mobile application on the computing device, the user interface comprising one or more code files, each having a hashed value, and the mobile application having an application update policy;
receiving a message communicated over a network from a server, the message indicating that a new version of the user interface of the mobile application is available, and the new version of the user interface comprising one or more new code files;
storing, based on the received message, version information corresponding to the new version of the user interface for the mobile application, wherein the version information includes:
a timestamp specifying when the new version of the user interface is available,
a retrieval indicator confirming the new version is downloaded, and
one or more unique file paths associated with a respective new code file for the new version of the user interface;
based on the timestamp, downloading the one or more new code files from the server according to the unique file paths, wherein the one or more new code files are associated with the new version of the user interface;
calculating a new hashed value for each of the one or more new code files;
updating the version information by 1) changing the retrieval indicator to reflect that the one or more new code files has been downloaded and 2) adding the new hashed value for the new code file; and
for each new code file:
comparing the new hashed value with the hashed value of the running mobile application;
if the hashed values are the same, then forbidding the new code file from updating the user interface; and
if the hashed values are different, designating the new code file as applicable to update the user interface;
accessing the application update policy to determine conditions under which an update to the user interface of the mobile application is set to occur, wherein the conditions include performing the update upon reboot of the computing device or during an uninterrupted non-user input state of the mobile application;
applying, by an operating system of the computing device, an authority to override the application update policy; and
based on the conditions being true or the operating system override authority, updating the user interface with the designated new code files.

2. The method of claim 1, wherein the version information further comprises: a unique version number associated with the new version, and a version manifest identifying one or more files included in the new version.

3. The method of claim 1, wherein the one or more new code files are downloaded using Hypertext Transfer Protocol (HTTP) or Hypertext Transfer Protocol Secure (HTTPS).

4. The method of claim 1, wherein updating the user interface with the designated new code files comprises:
constructing a view;
attaching a code loader to the view; and
setting the code loader to load code implementing the new version of the user interface of the mobile application and display the new version of the user interface in the view as one or more web pages.

5. The method of claim 1, wherein:
the mobile application is a native application executing on the computing device; and the user interface of the mobile application is implemented as one or more web pages.

6. The method of claim 1, wherein the computing device is a mobile device.

7. The method of claim 1, wherein the conditions specified by the mobile application update policy further include that the mobile application is not being displayed on a display of the computing device.

8. The method of claim 1, wherein the conditions specified by the mobile application update policy further include that the mobile application is not being executed by the computing device.

9. A system comprising:
a memory comprising instructions executable by one or more processors; and
the one or more processors coupled to the memory and operable to execute the instructions, the one or more processors being operable when executing the instructions to:
display a user interface for a running mobile application on a computing device including one or more of the processors, the user interface comprising one or more code files, each having a hashed value, and the mobile application having an application update policy;
receive a message communicated over a network from a server, the message indicating that a new version of a user interface of the mobile application is available, and the new version of the user interface comprising one or more new code files;
store, based on the received message, version information corresponding to the new version of the user interface for the mobile application, wherein the version information includes:
a timestamp specifying when the new version of the user interface is available,
a retrieval indicator confirming the new version is downloaded,
one or more unique file paths associated with a respective new code file for the new version of the user interface;
calculating a new hashed value for each of the one or more new code files;
update the version information by 1) changing the retrieval indicator to reflect that the one or more new code files has been downloaded and 2) adding new hashed value for the new code file; and
for each new code file:
compare the new hashed value with the hashed value of the running mobile application;
if the hashed values are the same, then forbid the new code file from updating the user interface; and
if the hashed values are different, designate the new code file as applicable to update the user interface;
access the application update policy to determine conditions under which an update to the user interface of the mobile application is set to occur, wherein the conditions include performing the update upon reboot of the computing device or during an uninterrupted non-user input state of the mobile application;
apply, by an operating system of the computing device, an authority to override the application update policy; and
based on conditions being true or the operating system override authority, update the user interface with the designated new code files.

10. The system of claim 9, wherein the version information further comprises: a unique version number associated with the new version, and a version manifest identifying one or more files included in the new version.

11. The system of claim 9, wherein the one or more new code files are downloaded using Hypertext Transfer Protocol (HTTP) or Hypertext Transfer Protocol Secure (HTTPS).

12. The system of claim 9, wherein updating the user interface with the designated new code files comprises:
constructing a view;
attaching a code loader to the view; and
setting the code loader to load code implementing the new version of the user interface of the mobile application and display the new version of the user interface in the view as one or more web pages.

13. The system of claim 9, wherein:
the mobile application is a native application executing on the computing device; and
the user interface of the mobile application is implemented as one or more web pages.

14. The system of claim 9, wherein the computing device is a mobile device.

15. The system of claim 9, wherein the conditions specified by the application update policy further include that the mobile application is not being displayed on a display of the computing device.

16. The system of claim 9, wherein the conditions specified by the application update policy further include that the mobile application is not being executed by the computing device.

17. One or more computer-readable non-transitory storage media embodying software operable when executed by a computer system to:
display a user interface for a running mobile application on a computing device associated with the computes system, the user interface comprising one or more code files, each having a hashed value, and the mobile application having an application update policy;
receive a message communicated over a network from a server, the message indicating that a new version of the user interface of the mobile application is available, and the new version of user interface comprising one or more new code files;
store, based on the received message, version information corresponding to the new version of the user interface for the mobile application, wherein the version information includes:
a timestamp specifying when the new version of the user interface is available,
a retrieval indicator confirming the new version is downloaded, and
one or more unique file paths associated with a respective new code file for the new version of the user interface;
based on the timestamp, download the one or more new code files from the server according to the unique file paths, wherein the one or more new code files are associated with the new version of the user interface;
calculate a new hashed value for each of the one or more new code files;
update the version information by 1) changing the retrieval indicator to reflect that the one or more new code files has been downloaded and 2) adding the new hashed value for the new code file; and
for each new code file:
compare the new hashed value with the hashed value of the running mobile application;

if the hashed values are the same, then forbid the new code file from updating the user interface; and if the hashed values are different, designate the new code file as applicable to update the user interface;

access the application update policy to determine conditions under which an update to the user interface of the mobile application is set to occur, wherein the conditions include performing the update upon reboot of the computing device or during an uninterrupted non-user input state of the mobile application;

apply, by an operating system of the computing device, an authority to override the application update policy; and based on the conditions being true or the operating system override authority, update the user interface with the designated new code files.

18. The media of claim 17, wherein the version information further comprises: a unique version number associated with the new version, and a version manifest identifying one or more files included in the new version.

19. The media of claim 17, wherein the one or more new code files are downloaded using Hypertext Transfer Protocol (HTTP) or Hypertext Transfer Protocol Secure (HTTPS).

20. The media of claim 17, wherein updating the user interface with the designated new code files comprises:
constructing a view;
attaching a code loader to the view; and
setting the code loader to load code implementing the new version of the user interface of the mobile application to display the new version of the user interface in the view as one or more web pages.

21. The media of claim 17, wherein:
the mobile application is a native application executing on the computing device; and
the user interface of the mobile application is implemented as one or more web pages.

22. The media of claim 17, wherein the computing device is a mobile device.

23. The media of claim 17, wherein the conditions specified by the application update policy further include that the mobile application is not being displayed on a display of the computing device.

24. The media of claim 17, wherein the conditions specified by the application update policy further include that the mobile application is not being executed by the computing device.

* * * * *